US008600395B2

(12) United States Patent
Lim et al.

(10) Patent No.: US 8,600,395 B2
(45) Date of Patent: Dec. 3, 2013

(54) METHOD OF CONFIGURING RADIO CONNECTION IN MULTIPLE CELL SYSTEM

(75) Inventors: Su Hwan Lim, Anyang-si (KR); Sang Wook Lee, Anyang-si (KR); In Jae Jung, Anyang-si (KR); In Kwon Seo, Anyang-si (KR); Bong Hoe Kim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 13/202,119

(22) PCT Filed: Mar. 11, 2010

(86) PCT No.: PCT/KR2010/001513
§ 371 (c)(1),
(2), (4) Date: Aug. 18, 2011

(87) PCT Pub. No.: WO2010/104334
PCT Pub. Date: Sep. 16, 2010

(65) Prior Publication Data
US 2011/0300872 A1 Dec. 8, 2011

(30) Foreign Application Priority Data
Mar. 11, 2009 (KR) .................... 10-2009-0020669

(51) Int. Cl.
*H04W 72/00* (2009.01)
(52) U.S. Cl.
USPC ........................................ 455/450
(58) Field of Classification Search
USPC ............. 370/252, 310.2, 328, 329, 332, 333, 370/334, 336, 341, 348; 455/450, 452.2, 455/464, 524
See application file for complete search history.

(56) References Cited

U.S. PATENT DOCUMENTS

| 6,456,844 | B1* | 9/2002 | Parantainen et al. ......... 455/423 |
| 2003/0036384 | A1* | 2/2003 | Chen et al. .................... 455/437 |
| 2005/0094600 | A1 | 5/2005 | Zhang et al. |
| 2005/0169202 | A1* | 8/2005 | Ratasuk et al. ............... 370/312 |
| 2005/0281228 | A1 | 12/2005 | Oh et al. |
| 2007/0189261 | A1* | 8/2007 | Choi et al. .................... 370/347 |
| 2009/0202014 | A1* | 8/2009 | Mujtaba et al. ............... 375/267 |
| 2009/0312027 | A1* | 12/2009 | Foschini et al. .............. 455/446 |
| 2010/0080137 | A1* | 4/2010 | Vedantham et al. .......... 370/252 |

FOREIGN PATENT DOCUMENTS

| KR | 10-2007-0105103 A | 10/2007 |
| WO | WO 02/30144 A1 | 4/2002 |

* cited by examiner

*Primary Examiner* — Wesley Kim
*Assistant Examiner* — Dinh P Nguyen
(74) *Attorney, Agent, or Firm* — Birch, Stewart, Kolasch & Birch, LLP

(57) ABSTRACT

A method of configuring a radio connection in a multiple cell system is provided. The method includes configuring a first radio connection between a user equipment (UE) and a primary base station (BS) and a second radio connection between the UE and a secondary BS based on a cooperative transmission configuration in which a plurality of BSs transmit the same data to the UE, receiving first channel state regarding the first radio connection and second channel state regarding the second radio connection from the UE, releasing at least one radio connection of the first radio connection and the second radio connection, the at least one radio connection having a worse channel state than a threshold, transmitting to the UE, a new cooperative transmission configuration changed by the release of the at least one radio connection, and receiving a layer reconfiguration complete message indicating completion of layer reconfiguration based on the new cooperative transmission configuration.

5 Claims, 6 Drawing Sheets

METHOD OF CONFIGURING RADIO CONNECTION IN MULTIPLE CELL SYSTEM

TECHNICAL FIELD

The present invention relates to wireless communications, and more particularly, to a method of configuring a radio connection in a multiple cell system.

BACKGROUND ART

Recently, there has been an explosive increase in the demand for wireless data services. Further, an evolution from a wireless voice service to a wireless data service requires a gradual increase of wireless capacity. To cope with such a demand, wireless service providers and wireless equipment manufacturers attempt to improve a data rate of a wireless system, which results in motivating massive researches. A wireless channel experiences various problems such as path loss, shadowing, fading, noise, limited bandwidth, power limit of a user equipment (UE), and interference between other users. Due to these limitations, the wireless channel has a shape of a narrow pipe that obstructs fast data flow, and it is difficult to design an effective bandwidth of wireless communication providing high-speed data transmission. The designing of the wireless system has other challenges such as resource allocation, mobile issues in association with a rapidly changing physical channel, portability, security, and privacy.

When a transport channel experiences deep fading, if a different version or a replica of a transmitted signal is not additionally transmitted, it is difficult for a receiver to determine the transmitted signal. A resource corresponding to the different version or the replica is referred to as diversity, and is one of most important factors that contribute to reliable transmission over a wireless channel. The use of the diversity can maximize data transfer capacity or data transfer reliability. A system for implementing the diversity by using multiple transmit (Tx) antennas and multiple receive (Rx) antennas is referred to as a multiple input multiple output (MIMO) system. The MIMO system is also referred to as a multiple antenna system.

A multiple antenna scheme includes space frequency block coding (SFBC), space time block coding (STBC), cyclic delay diversity (CDD), frequency switched transmit diversity (FSTD), time switched transmit diversity (TSTD), precoding vector switching (PVS), spatial multiplexing (SM), generalized cyclic delay diversity (GCDD), selective virtual antenna permutation (S-VAP), etc.

Such a MIMO scheme is also considered as a measure for improving a data rate and reliability in a communication system having a multiple cell structure. Meanwhile, researches on a cooperative transmission method are actively conducted for transmission of a signal through mutual cooperation between cells or between base stations (BSs) in the communication system having the multiple cell structure. The UE can improve not only a Tx power gain but also signal sensitivity by communicating with a plurality of BSs.

In general, before performing data transmission/reception with the BS, the UE measures channel quality of each cell by using a reference signal transmitted from the BS. Further, the UE configures a radio connection with a cell determined by the measurement. The radio connection may also be referred to as a radio link or a radio resource control (RRC) connection. The UE may persistently perform the measurement even after the radio connection is configured. This is because the measurement provides the BS with a variety of information required for proper network management and resource allocation in consideration of a radio environment.

However, in the cooperative transmission method, the UE configures and/or reconfigures a radio connection with a plurality of cells instead of one cell. In particular, it is preferable to reliably maintain a radio connection between the UE and the BS in order to continuously transmit and receive data in the process of reconfiguring the radio connection. Therefore, there is a need for a method capable of configuring or reconfiguring a radio connection with a plurality of cells without data loss in the cooperative transmission method.

DISCLOSURE OF INVENTION

Technical Problem

The present invention provides a method of configuring a radio connection in a multiple cell system.

Solution to Problem

According to an aspect of the present invention, a method of configuring a radio connection in a multiple cell system is provided. The method includes configuring a first radio connection between a user equipment (UE) and a primary base station (BS) and a second radio connection between the UE and a secondary BS based on a cooperative transmission configuration in which a plurality of BSs transmit the same data to the UE, receiving first channel state regarding the first radio connection and second channel state regarding the second radio connection from the UE, releasing at least one radio connection of the first radio connection and the second radio connection, the at least one radio connection having a worse channel state than a threshold, transmitting to the UE, a new cooperative transmission configuration changed by the release of the at least one radio connection, and receiving a layer reconfiguration complete message indicating completion of layer reconfiguration based on the new cooperative transmission configuration.

Advantageous Effects of Invention

According to the present invention, when a data service is provided by a plurality of base stations, seamless data transmission can be achieved by fast link adaptation even if the radio connection is released due to deterioration in channel quality of a part of the radio connection.

MODE FOR THE INVENTION

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802.20, evolved UTRA (E-UTRA), etc. The UTRA is a part of a universal mobile telecommunication system (UMTS). $3^{rd}$ generation partnership project (3GPP) long term evolution (LTE) is a part of an evolved UMTS (E-UMTS) using the E-UTRA. The 3GPP LTE uses the OFDMA in downlink and uses the SC-FDMA in uplink. LTE-advance (LTE-A) is an evolution of the 3GPP LTE.

Figure 1:
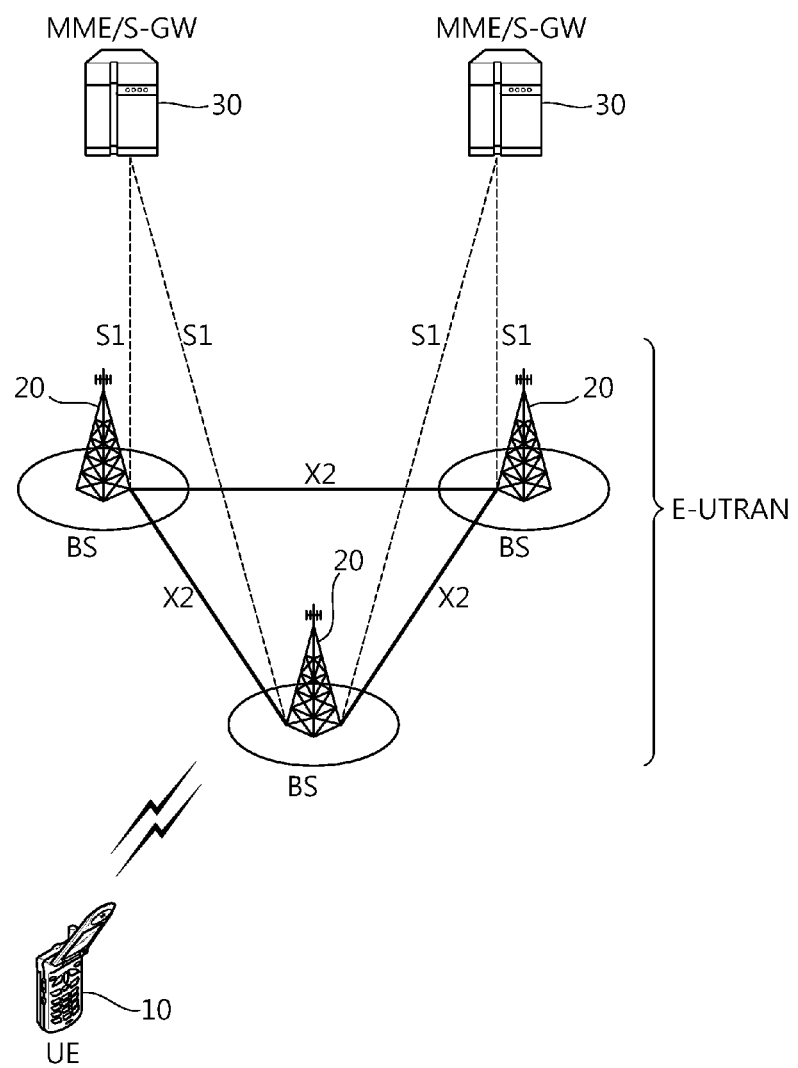
FIG. 1 shows a structure of a wireless communication system.

FIG. 1 shows a structure of a wireless communication system. The wireless communication system may have a network structure of an evolved-universal mobile telecommunications system (E-UMTS). An E-UMTS system may also be referred to as a long term evolution (LTE) system. The wireless communication system can be widely deployed to provide a variety of communication services, such as voices, packet data, etc.

Referring to FIG. 1, an evolved-UMTS terrestrial radio access network (E-UTRAN) includes at least one base station (BS) 20 which provides a control plane and a user plane.

A user equipment (UE) 10 may be fixed or mobile, and may be referred to as another terminology, such as a mobile station (MS), a user terminal (UT), a subscriber station (SS), a wireless device, etc. The BS 20 is generally a fixed station that communicates with the UE 10 and may be referred to as another terminology, such as an evolved node-B (eNB), a base transceiver system (BTS), an access point, etc. There are one or more cells within the coverage of the BS 20. The cell is an area in which the BS 20 provides a communication service. Interfaces for transmitting user traffic or control traffic may be used between the BSs 20. Hereinafter, a downlink is defined as a communication link from the BS 20 to the UE 10, and an uplink is defined as a communication link from the UE 10 to the BS 20. The downlink is also referred to as a forward link. The uplink is also referred to as a reverse link. In the downlink, a transmitter may be a part of the BS 20, and a receiver may be a part of the UE 10. In the uplink, the transmitter may be a part of the UE 10, and the receiver may be a part of the BS 20.

The BSs 20 are interconnected by means of an X2 interface. The X2 interface is used to exchange a message between the BSs 20. The BSs 20 are also connected by means of an S1 interface to an evolved packet core (EPC), more specifically, to a mobility management entity (MME)/serving gateway (S-GW) 30. The S1 interface supports a many-to-many relation between the BS 20 and the MME/S-GW 30.

There is no restriction on the multiple access scheme used in the wireless communication system. The multiple access scheme may be based on code division multiple access (CDMA), time division multiple access (TDMA), frequency division multiple access (FDMA), single-carrier FDMA (SC-FDMA), orthogonal frequency division multiple access (OFDMA), or other well-known modulation schemes. In these modulation schemes, signals received from multiple users are demodulated to increase capacity of the communication system.

Layers of a radio interface protocol between the UE and the network can be classified into L1 layer (a first layer), L2 layer (a second layer), and L3 layer (a third layer) based on the lower three layers of the open system interconnection (OSI) model that is well-known in the communication system. A physical layer (or simply a PHY layer) belongs to the first layer and provides an information transfer service through a physical channel. A radio resource control (RRC) layer belongs to the third layer and serves to control radio resources between the UE and the network. The UE and the network exchange RRC messages via the RRC layer.

Several downlink physical control channels are used in the PHY layer. A physical downlink control channel (PDCCH) informs the UE of resource assignment of a physical channel (PCH) and a downlink-shared channel (DL-SCH), and also informs the UE of hybrid automatic repeat request (HARQ) information related to the DL-SCH. The PDCCH may carry a downlink grant including control information on downlink transmission and an uplink grant including control information on uplink transmission to the UE. The control information on downlink transmission includes information on resource allocation, information on modulation and coding, information on an HARQ process, a new data indicator, information on a redundancy version, information on power control, and if multiple antennas are included, information on precoding. The control information on downlink transmission is defined differently according to an operation mode of the UE.

Scheduling control information on uplink transmission includes information on resource allocation, hopping information, information on modulation and coding, information on an HARQ process, a new data indictor, power control information, information on a resource of a reference signal for demodulation, and channel quality information (CQI) transmission request information. If multiple antenna transmission is supported in uplink transmission, information on precoding may be transmitted together with downlink control information.

A physical control format indicator channel (PCFICH) informs the UE of the number of orthogonal frequency division multiplexing (OFDM) symbols used for transmission of the PDCCHs within a subframe. The PCFICH is transmitted in every subframe. A physical hybrid ARQ indicator channel (PHICH) carries HARQ acknowledgement (ACK)/negative-acknowledgement (NACK) signals in response to uplink transmission.

Figure 2:
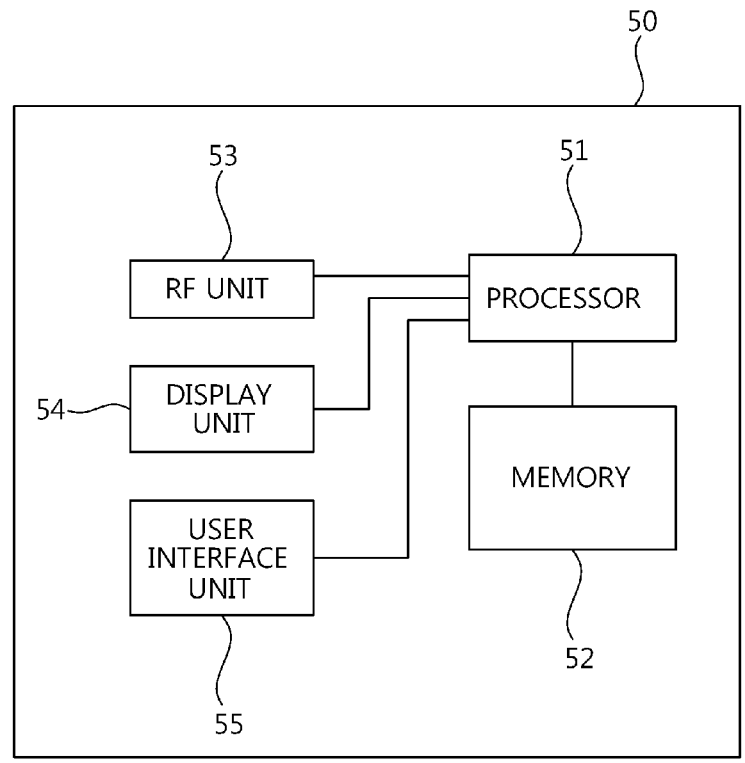
FIG. 2 is a block diagram showing constitutional elements of a UE.

FIG. 2 is a block diagram showing constitutional elements of a UE. Referring to FIG. 2, a UE 50 includes a processor 51, a memory 52, a radio frequency (RF) unit 53, a display unit 54, and a user interface unit 55. Layers of a radio interface protocol are implemented in the processor 51. The processor 51 provides the control plane and the user plane. The function of each layer can be implemented in the processor 51. The memory 52 is coupled to the processor 51 and stores an operating system, applications, and general files. The display unit 54 displays a variety of information of the UE 50 and may use a well-known element such as a liquid crystal display (LCD), an organic light emitting diode (OLED), etc. The user interface unit 55 can be configured with a combination of well-known user interfaces such as a keypad, a touch screen, etc. The RF unit 53 is coupled to the processor 51 and transmits and/or receives radio signals.

Figure 3:
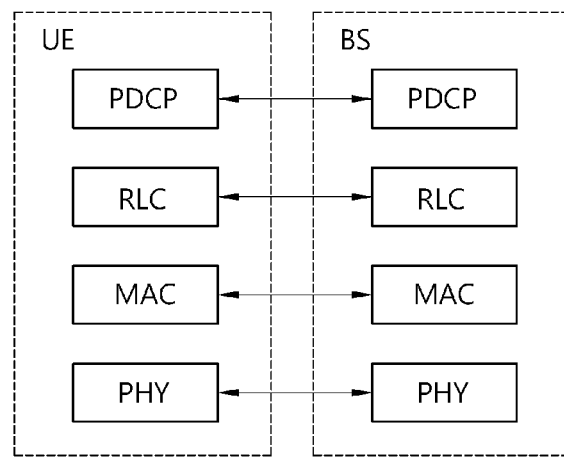
FIG. 3 is a diagram showing a radio protocol architecture for a user plane.
Figure 4:
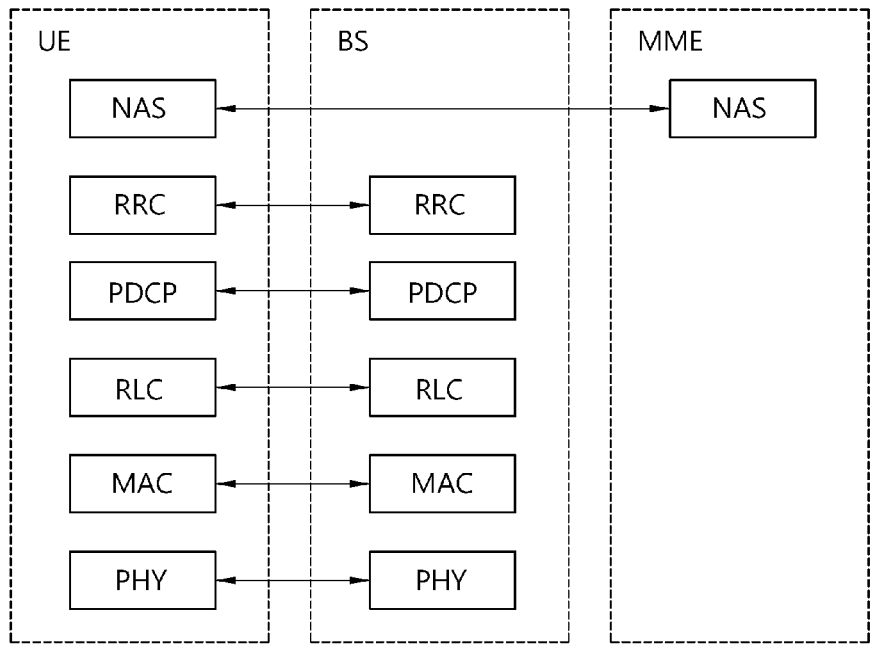
FIG. 4 is a diagram showing a radio protocol architecture for a control plane.

FIG. 3 is a diagram showing a radio protocol architecture for a user plane. FIG. 4 is a diagram showing a radio protocol architecture for a control plane. They illustrate an architecture of a radio interface protocol between a UE and an E-UTRAN. The user plane is a protocol stack for user data transmission. The control plane is a protocol stack for control signal transmission.

Referring to FIGS. 3 and 4, a PHY layer belongs to the first layer and provides an upper layer with an information transfer service through a physical channel. The PHY layer is coupled with a medium access control (MAC) layer, i.e., an upper layer of the PHY layer, through a transport channel. Data is transferred between the MAC layer and the PHY layer through the transport channel. Between different PHY layers (i.e., a PHY layer of a transmitter and a PHY layer of a receiver), data are transferred through the physical channel.

The MAC layer belongs to the second layer and provides services to a radio link control (RLC) layer, i.e., an upper layer of the MAC layer, through a logical channel. The RLC layer in the second layer supports reliable data transfer. There are three operating modes in the RLC layer, that is, a transparent mode (TM), an unacknowledged mode (UM), and an acknowledged mode (AM) according to a data transfer method. An AM RLC provides bidirectional data transmission services and supports retransmission when the transfer of the RLC PDU fails.

A packet data convergence protocol (PDCP) layer belongs to the second layer and performs a header compression function for decreasing an Internet protocol (IP) packet header size.

A radio resource control (RRC) layer belongs to the third layer and is defined only in the control plane. The RRC layer serves to control the logical channel, the transport channel, and the physical channel in association with configuration, reconfiguration and release of radio bearers (RBs). Various RRC states are defined according to a communication state of the UE, and optionally, a transition between RRC states is possible. In the RRC layer, various procedures related to radio resource management are defined, such as, system information broadcasting, an RRC connection management procedure, a radio bearer control procedure, a security procedure, a measurement procedure, a mobility management procedure (i.e., a handover), etc.

The measurement procedure provides a BS with a variety of information required for proper network management and resource allocation in consideration of a radio environment. The measurement may be performed in various regions. RRC messages related to the measurement are information related to the measurement to be performed by the UE. Measurement-related parameters are broadcast by using system information or are delivered to the UE by using a measurement control message. The UE reports a measurement report to a network either periodically or in an even-driven manner by transmitting a measurement report message.

A non access stratum (NAS) is a functional layer for signaling or traffic message exchange between the UE and the BS.

Figure 5:
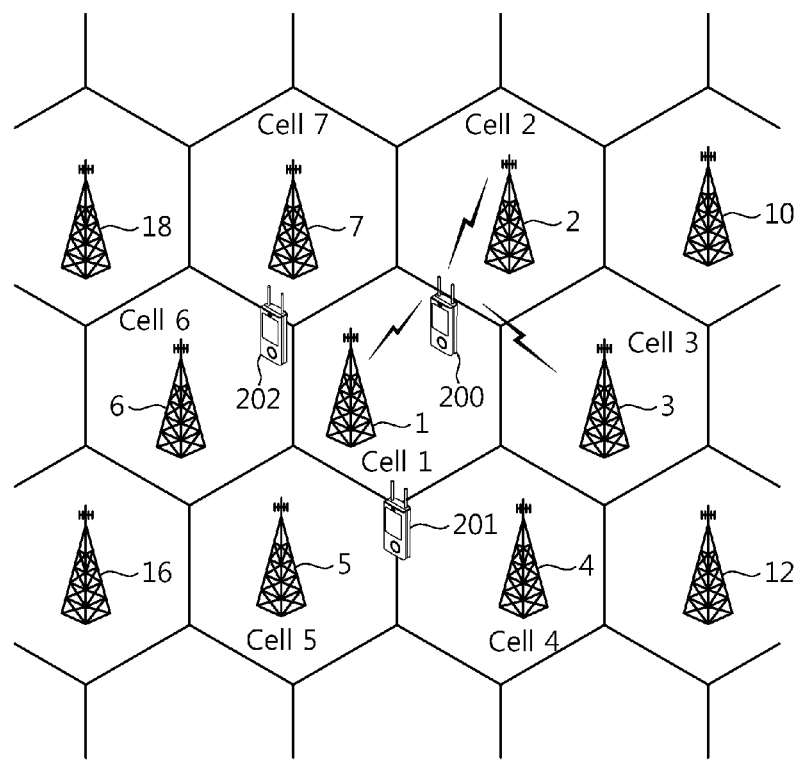
FIG. 5 shows a wireless communication system in a multiple cell environment.

FIG. 5 shows a wireless communication system in a multiple cell environment. In FIG. 5, one UE performs communication with a plurality of cells according to a method of cooperative transmission between cells. The cooperative transmission method widely refers to a method of performing communication with one UE in cooperation of different multiple cells. A plurality of cells cooperating with one another are referred to as cooperative cells. A plurality of BSs cooperating with one another are referred to as cooperative BSs (or eNBs). The cooperative transmission method is also referred to as coordinated multiple points (COMP) transmission in LTE-A. Although one BS can control a plurality of cells, for clarity, it is assumed hereinafter that one BS controls one cell.

The cooperative BSs consist of a primary BS and a secondary BS. The primary BS is also referred to as a serving BS. The secondary BS is also referred to as a neighboring BS or other BS. The primary BS may transmit not only downlink scheduling information provided by the primary BS for the UE but also downlink scheduling information provided by the secondary BS for the UE. The secondary BS may or may not transmit downlink scheduling information for the UE.

In general, if a multiple cellular communication system performs communicate between the BS and the UE in a state where a frequency reuse 1 is maintained in the same time and frequency band in each cell without considering other cells, a UE located closer to a cell boundary has significantly poor performance due to interference from other cells.

Several schemes have been researched up to now to overcome such a performance deterioration phenomenon caused by the interference. As one of the schemes, a method of cooperative transmission between multiple cells may be used to increase a data rate of an entire system by effectively removing an influence of the interference.

Referring to FIG. 5, a wireless communication system includes a plurality of BSs 1, 2, 12, and a UE 200. Each BS belongs to one cell. Each BS includes one or a plurality of transmit (Tx) antennas.

The UE 200 belongs to a cell 1. Thus, the cell 1 is a primary cell or a serving cell, and the BS 1 is a primary BS or a serving BS. Meanwhile, the UE 200 is located in a boundary of the cell 1, a cell 2, and a cell 3. Therefore, the UE 200 may be significantly affected by not only the primary BS, i.e., the BS 1, but also the secondary BSs, i.e., the BS 2 and the BS 3. As a result, as cooperative BSs, the BS 1, the BS 2, and the BS 3 cooperatively transmit data to the UE 200. Accordingly, reception capability of the UE 200 can be improved by minimizing an interference signal.

If the cooperative BSs cooperatively transmit a data signal to the UE 200, signals transmitted by BSs 4, 5, 12 act as interference signals to the UE 200. An index set of the cooperative BSs can be expressed by S={1, 2, 3}. An index set of neighboring BSs can be expressed by I={4, 5, 12}.

However, this is only an exemplary case where the primary BS and the secondary BS perform cooperative transmission to the UE located in the cell boundary, and a location of a cell and a BS performing cooperative transmission, the number of cells and BSs, or the like are not limited thereto. The cooperative BS may be determined properly by considering a distance between the UE and the neighboring BS, a signal to interference noise ratio (SINR), a spectral efficiency, etc. Although the number of cells and BSs are limited to 12 in FIG. 5, the present invention is not limited thereto, and thus the number of cells and BSs can be extended to above 12.

In the cooperative transmission method, the UE configures and/or reconfigures a radio connection with a plurality of BSs instead of one BS. In particular, it is preferable to reliably maintain a radio connection between the UE and the BS in order to continuously transmit and receive data in the process of reconfiguring the radio connection. Hereinafter, a method of reconfiguring a radio connection with a plurality of cells without data loss in the cooperative transmission method will be described.

Figure 6:
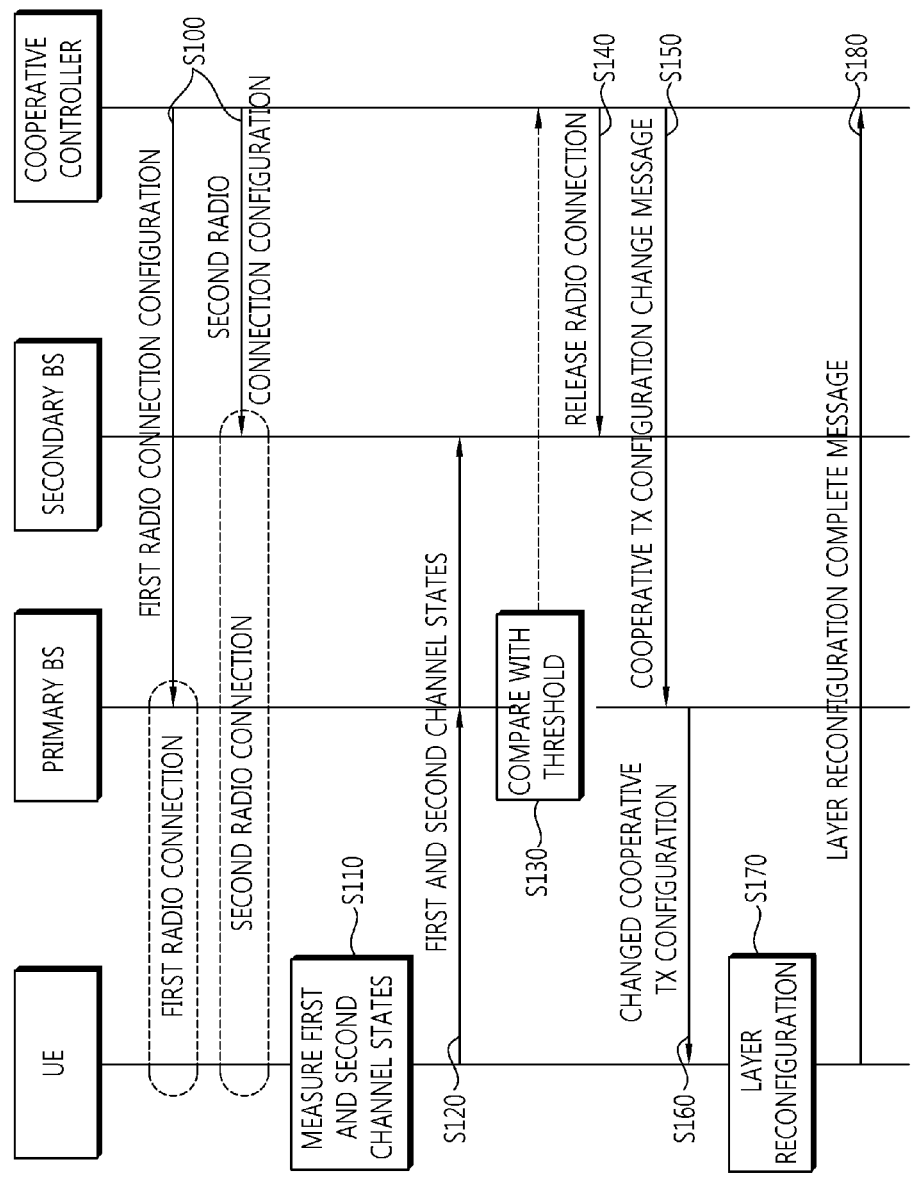
FIG. 6 is a flowchart for explaining a method of configuring a radio connection in a multiple cell system according to an embodiment of the present invention.

FIG. 6 is a flowchart for explaining a method of configuring a radio connection in a multiple cell system according to an embodiment of the present invention. This is a case where both a primary BS and a secondary BS transmit a PDCCH to a UE.

Referring to FIG. 6, the UE configures a first radio connection with the primary BS, and configures a second radio connection with the secondary BS (step S100). In the cooperative transmission method, the first radio connection and the second radio connection are configured by a cooperative controller that controls the radio connections for the primary BS and the secondary BS. The cooperative BS manages a procedure of an RRC layer level. The cooperative controller may be located in the primary BS or the secondary BS, or may exist as an independent entity. For clarity, the cooperative controller is separately depicted.

The first radio connection and the second radio connection may be configured simultaneously or may be configured with a time difference. The radio connections may be differently configured by a cooperative Tx configuration. The cooperative Tx configuration collectively refers to control information required to perform the cooperative transmission method, i.e., information on a cooperative BS, modulation and coding scheme (MCS) information, the number of Tx antennas, precoding information, a rank, etc. The cooperative Tx configuration is transmitted using an RRC message of the BS, and is thus transmitted to the UE through a PDSCH which is a downlink data channel. The cooperative Tx configuration may also be referred to as a CoMP agreement.

The first radio connection and the second radio connection experience independent channel environments. Therefore, a data spectral efficiency for the UE is determined according to a channel environment of each radio connection. The greater the number of radio connections, the more reliable the data reception of the UE. This is because, even if channel states of some of radio connection are bad, an error rate can be dispersed since data can be transmitted with other radio connections.

The UE measures a first channel state by using a reference signal transmitted from the primary BS through the first radio connection, and measures a second channel state by using a reference signal transmitted from the secondary BS through the second radio connection (step S110). The UE measures receive (Rx) power of the reference signals, and thereafter determines the channel states by using a hypothetical PDCCH block error rate (BLER) value which changes the measured Rx power to a statistical BLER value.

The UE transmits first channel measurement information obtained by measuring the first channel state and second channel measurement information obtained by measuring the second channel state either to only the primary BS or to both the primary BS and the secondary BS (step S120). The first and second channel measurement information may be transmitted through a PUSCH which is an uplink data channel in such a format that a measurement report is transmitted from an RRC layer of the UE to an RRC layer of the BS. By transmitting both the first and second channel measurement information, it is helpful for the cooperative controller to configure a new cooperative Tx configuration according to a channel environment change.

The primary BS compares each of the first and second channel state with a threshold, and determines whether a channel state is worse than the threshold (step S130). The threshold may be a specific BLER value. Alternatively, the threshold may be a specific signal to interference noise ratio (SINR).

For one example, if the channel measurement information is greater than or equal to 10% of a PDCCH BLER which is a criterion for a radio connection failure, the primary BS may determine that the channel state is worse than the threshold. For another example, if a timer T30 starts, the primary BS may determine that the channel state is worse than the threshold. For another example, if the channel measurement information is greater than or equal to 10% of the PDCCH BLER which is the criterion for the radio connection failure and if the timer T30 starts, the primary BS may determine that the channel state is worse than the threshold.

The cooperative controller releases a radio connection of which channel state is worse than the threshold (step S140). This is because the UE cannot properly receive data through the radio connection having the worse channel state. In this case, a radio link problem is triggered in the cooperative controller.

Herein, even if some of radio connections are released, remaining radio connections may be maintained. For example, even if the first radio connection is released, the second radio connection may be maintained. On the contrary, even if the second radio connection is released, the first radio connection may be maintained. This is a case where the PDCCH for the UE is transmitted through not only the first radio connection but also the second radio connection. Accordingly, the UE reports only a changed cooperative transmission configuration according to a remaining radio connection without having to perform a process of reconfiguring a radio connection after releasing all radio connections. That it, a delay time configured for reconfiguration of the radio connection is eliminated, and thus the UE can receive data seamlessly. Accordingly, seamless data communication is possible similarly to soft handover. Although only the second radio connection is released in step S140, the same process is also performed in a case where the first radio connection is released. In this case, the secondary BS receives a cooperative Tx configuration change message in step S150, and the secondary BS is an entity for transmitting the changed cooperative transmission configuration in step S160.

The cooperative controller transmits the cooperative Tx configuration change message to the primary BS (step S150). The cooperative Tx configuration change message includes indication information reporting that the cooperative Tx configuration is changed and the changed cooperative Tx configuration. According to a radio connection remaining after the releasing process, the changed cooperative Tx configuration is transmitted to the UE (step S160). The changed cooperative Tx configuration may be transmitted through a PDSCH based on the radio connection remaining after the releasing process. Since the second radio connection is released in FIG. 6, it is shown that the changed cooperative Tx configuration is transmitted through a PDSCH based on the first radio connection. Of course, when the first radio connection is released, the changed cooperative Tx configuration is transmitted through a PDSCH based on the second radio connection.

The UE performs layer reconfiguration according to the changed cooperative Tx configuration (step S170). The layer reconfiguration may be achieved by delivering a CPHY_RL_Setup-REQ message from an RRC layer of the UE to a MAC or PHY layer of the UE. The layer reconfiguration includes reconfiguration of MCS information of the PHY layer, the number of Tx antennas, precoding information, a rank, etc. The performing of the layer reconfiguration is a selective process which may be performed or not performed according to the changed cooperative Tx configuration. In a case where the layer reconfiguration is not performed, it is determined that the UE can receive data only with an existing layer configuration. That is, the UE can decode data without an additional layer configuration.

The UE transmits a layer reconfiguration complete message to the BS according to the changed cooperative Tx configuration (step S180). If the layer reconfiguration is performed, the layer reconfiguration complete message is a message for indicating completion of the layer reconfiguration. If the layer reconfiguration is not performed, the layer reconfiguration complete message is a message for confirming that data reception is possible according to the changed cooperative Tx configuration.

According to the present invention, even if channel states of some radio connections become worse, remaining radio connections can be used to perform seamless communication by simply changing a cooperative Tx configuration without having to release (or remove) all radio connections.

Figure 7:
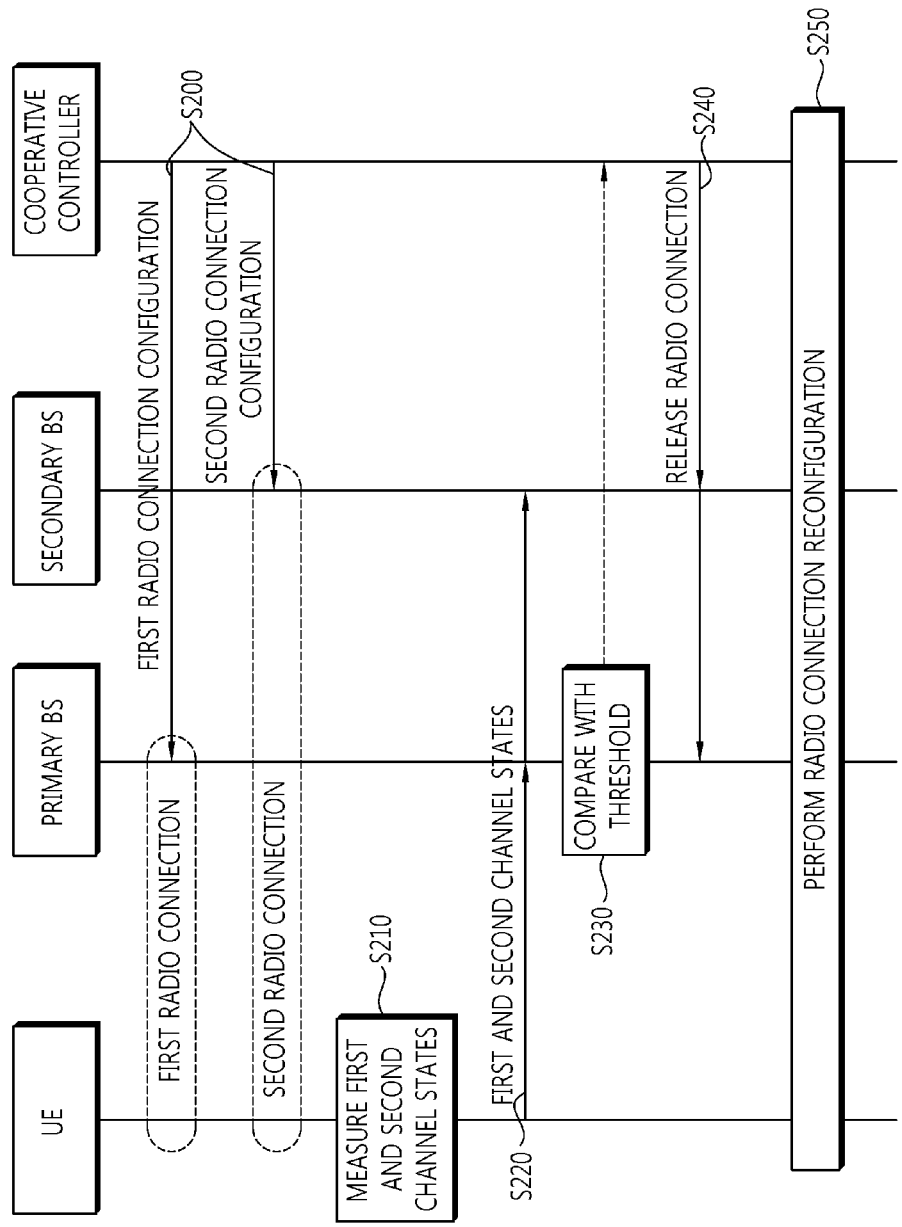
FIG. 7 is a diagram for explaining a method of configuring a radio connection according to another embodiment of the present invention.

FIG. 7 is a diagram for explaining a method of configuring a radio connection according to another embodiment of the present invention. This is a case where a PDCCH is transmitted by only a primary BS to a UE.

Referring to FIG. 7, the UE configures a first radio connection with the primary BS, and configures a second radio connection to a secondary BS (step S200). The UE measures a first channel state by using a reference signal transmitted from the primary BS through the first radio connection, and measures a second channel state by using a reference signal transmitted from the secondary BS through the second radio connection (step S210). The UE transmits first channel measurement information obtained by measuring the first channel state and second channel measurement information obtained by measuring the second channel state either to only the primary BS or to both the primary BS and the secondary BS (step S220). The primary BS compares each of the first and second channel states with a threshold, and determines whether a channel state is worse than the threshold (step S230).

If the first channel state is worse than the threshold, a cooperative controller releases all radio connections (step S240). That is, if the first radio connection is released, the second radio connection may be released even if a channel state of the remaining second radio connection is better than the threshold. This is because the PDCCH for the UE is transmitted only through the first radio connection and is not transmitted through the second radio connection, and thus the UE is no longer able to receive the PDCCH when the first radio connection is released. Since all cooperative radio connections are released, the UE performs a radio connection reconfiguration process for performing initial cell search (step S250). If the first channel state is better than the threshold and the second channel measurement information is worse than the threshold, radio connection configuration is achieved by the same procedure as FIG. 6.

Figure 8:
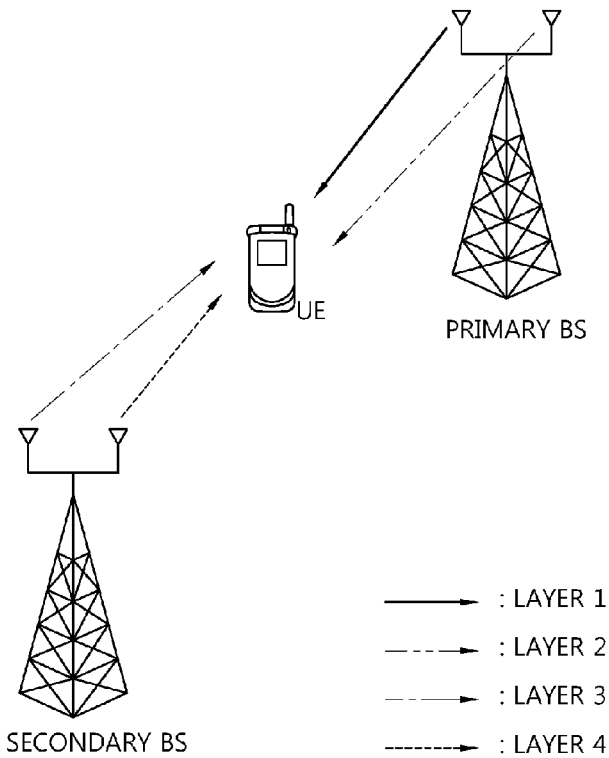
FIG. 8 is a diagram for explaining radio connection configuration according to an embodiment of the present invention.

FIG. 8 is a diagram for explaining radio connection configuration according to an embodiment of the present invention.

Referring to FIG. 8, each of a primary BS and a secondary BS transmits data to a UE using two Tx antennas. This is communication based on a cooperative transmission method. Hereinafter, a layer denotes the number of independent Tx data streams when a plurality of Tx antennas are used, and the layer corresponds to a value of a rank. These independent data streams may be the same data or different data. From the perspective of the UE, it can be regarded that one BS transmits different data to four layers by using four Tx antennas in total.

It is assumed that a radio connection between the primary BS and the UE is a first radio connection, and a radio connection between the secondary BS and the UE is a second radio connection. If a radio link problem occurs due to a bad channel state of the second radio connection, a time T310 starts. Meanwhile, the primary BS releases the second radio connection, and changes a cooperative Tx configuration. Further, the primary BS transmits the changed cooperative Tx configuration to the UE.

The UE may change a layer configuration of the UE on the basis of the changed cooperative Tx configuration. Alternatively, in case of using a previous cooperative Tx configuration, if it is configured that the UE can perform cell selection, the UE may directly receive data without changing the layer configuration.

In this case, the UE transmits a layer configuration complete message to the primary BS to report that data reception is possible even if the layer configuration is not changed.

Since a radio connection having a bad channel state is released while using all of the four antennas, a diversity gain decreases. Further, data retransmission occurs and thus throughput may deteriorate. Advantageously, however, an error rate of data transmission may decrease, and a seamless data service is possible. In addition, in a case where cell selection is possible by transmitting the same data in each cell through two Tx antennas by each of a primary cell and a secondary cell, even if one cell is disconnected due to a bad channel state, a cooperative Tx configuration does not change and thus the UE can receive data.

Figure 9:
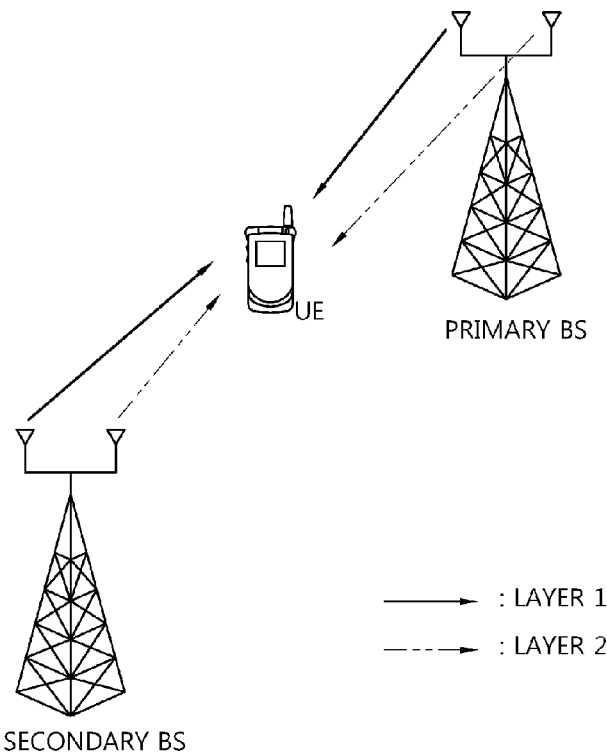
FIG. 9 is a diagram for explaining radio connection configuration according to another embodiment of the present invention.

FIG. 9 is a diagram for explaining radio connection configuration according to another embodiment of the present invention.

Referring to FIG. 9, each of a primary BS and a secondary BS transmits data to a UE through two Tx antennas. Unlink in FIG. 8 in which four layers are used, the same data is transmitted to the UE over two layers by using two Tx antennas of each BS so that cell selection is possible in each radio connection.

The present invention can be implemented with hardware, software, or combination thereof. In hardware implementation, the present invention can be implemented with one of an application specific integrated circuit (ASIC), a digital signal processor (DSP), a programmable logic device (PLD), a field programmable gate array (FPGA), a processor, a controller, a microprocessor, other electronic units, and combination thereof, which are designed to perform the aforementioned functions. In software implementation, the present invention can be implemented with a module for performing the aforementioned functions. Software is storable in a memory unit and executed by the processor. Various means widely known to those skilled in the art can be used as the memory unit or the processor.

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

The invention claimed is:

1. A method of configuring a radio connection in a multiple cell system, the method comprising:
    establishing a first radio connection between a user equipment (UE) and a primary cell and a second radio connection between the UE and a secondary cell, wherein the primary cell and the secondary cell transmit data to the UE using cooperative transmission;

receiving, from the UE, channel state information representing channel conditions of the first radio connection and the second radio connection;

determining a radio connection to be released from at least one of the first radio connection and the second radio connection based on the channel state information;

if the second radio connection is determined as the released radio connection, transmitting, to the UE, a cooperative transmission configuration indicating the release of the second radio connection while keeping the first radio connection;

receiving, from the UE, a confirmation message for the cooperative transmission configuration; and if the first radio connection is determined as the released radio connection, releasing the first and second radio connections.

2. The method of claim 1, wherein a physical downlink control channel (PDCCH) is transmitted to the UE through the first radio connection.

3. The method of claim 1, wherein the cooperative transmission configuration is transmitted through the primary cell.

4. A base station comprising:
a memory; and
a processor coupled with the memory and configured to:
establish a first radio connection between a user equipment (UE) and a primary cell and establish a second radio connection between the UE and a secondary cell, wherein the primary cell and the secondary cell transmit data to the UE using cooperative transmission;
receive, from the UE, channel state information representing channel conditions of the first radio connection and the second radio connection;
determine a radio connection to be released from at least one of the first radio connection and the second radio connection based on the channel state information;
if the second radio connection is determined as the released radio connection, transmit, to the UE, a cooperative transmission configuration indicating a release of the second radio connection while keeping the first radio connection;
receive, from the UE, a confirmation message for the cooperative transmission configuration; and
if the first radio connection is determined as the released radio connection, release the first and second radio connections.

5. A user equipment (UE) comprising:
a radio frequency unit configured to transmit and receive radio signals; and
a processor coupled with the radio frequency unit and configured to:
establish a first radio connection with a primary cell and establish a second radio connection with a secondary cell, wherein the primary cell and the secondary cell transmit data to the UE using cooperative transmission;
transmit, to a base station, channel state information representing channel conditions of the first radio connection and the second radio connection;
receive, from the base station, a cooperative transmission configuration indicating a release of the second radio connection while keeping the first radio connection;
transmit, to the base station, a confirmation message for the cooperative transmission configuration; and
if the first radio connection is determined as the released radio connection, release the first and second radio connections.

* * * * *